H. A. HARRAH.
TRACTOR.
APPLICATION FILED JAN. 11, 1915.
1,214,673.
Patented Feb. 6, 1917.
2 SHEETS—SHEET 2.
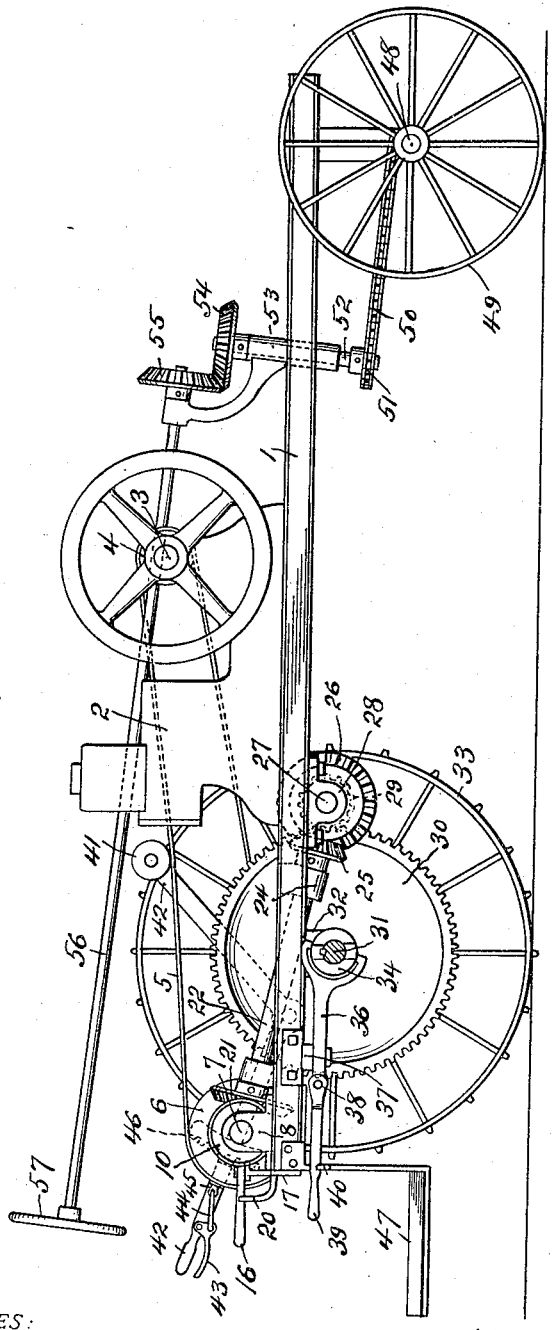
WITNESSES:
R. Hamilton
J. Cathcart
INVENTOR.
Hillis A. Harrah,
BY Warren D. House
His ATTORNEY

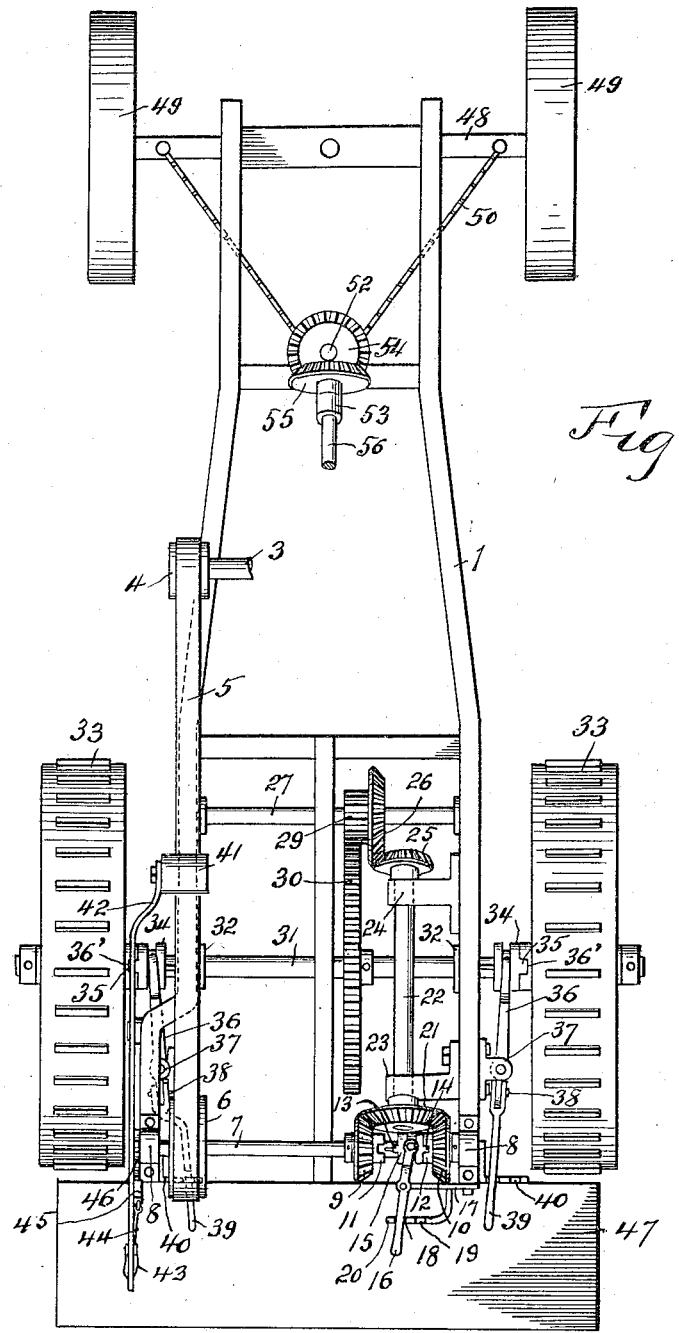

UNITED STATES PATENT OFFICE.

HILLIS A. HARRAH, OF POMONA, KANSAS.

TRACTOR.

1,214,673.  Specification of Letters Patent.  Patented Feb. 6, 1917.

Application filed January 11, 1915.   Serial No. 1,582.

*To all whom it may concern:*

Be it known that I, HILLIS A. HARRAH, a citizen of the United States, residing at Pomona, in the county of Franklin and State of Kansas, have invented a certain new and useful Improvement in Tractors, of which the following is a specification.

My invention relates to improvements in tractors.

It has for its object the providing of a tractor, which is simple and strong in construction and which may be easily turned in sharp curves in either direction and which may be readily driven either forwardly or backwardly.

My improved tractor is adapted for use in drawing plows, cultivators or other devices.

The novel features of my invention are hereinafter fully described and claimed.

Figure 1 of the accompanying drawings, which illustrate the preferred embodiment of my invention, is a plan view of my improved tractor, some of the parts being removed and others broken away, and both of the axle clutches being shown locked to the carrying wheels. Fig. 2 is a side elevation of the tractor.

Similar reference characters designate similar parts in the different views.

1 designates a carrying frame which may be of any suitable form and construction, and which is preferably made of rolled structural steel. Mounted on the frame 1 is a motor 2, which may be a gas engine of the usual type provided with the ordinary crank shaft 3 to which is secured a driving pulley 4, which is connected by a belt 5 with a driven pulley 6, which is rigidly secured to a horizontal transverse shaft 7 rotatably mounted on the frame 1, adjacent to the rear end thereof, in suitable bearings 8. Rotatable on the shaft 7 are two bevel driving gears 9 and 10, which at their inner ends are respectively provided with clutch teeth 11 and 12, which are adapted to be engaged respectively with clutch teeth 13 and 14 which are provided respectively at opposite ends of a clutch member 15, which is splined to the shaft 7, so as to rotate therewith and to be alternately slid into and out of locked engagement with the driving gears 9 and 10. An operating lever 16 is pivoted to a bracket 17, secured to the frame 1, and has its forward bifurcated end engaging the clutch member 15 in the usual manner. The lever 16 is adapted to be swung into either of two notches 18 and 19 provided in a bracket 20, which is secured to the bracket 17. When the lever 16 is in the notch 18, the clutch member 15 will be held engaged with the driving gear 10. When the lever 16 is in the notch 19, said clutch member will be in locked engagement with the driving gear 9. A driven gear 21 is constantly in mesh with the driving gears 9 and 10, which are respectively disposed at opposite sides of the axis of the driven gear, whereby the latter is adapted to be driven alternately in opposite directions by the driving gears, its direction of rotation depending on which one of the driving gears is at that time locked to the shaft 7. The driven gear 21 is rigidly secured to the rear end of an inclined shaft 22, which is disposed at right angles to the shaft 7 and which is rotatably mounted in bearings 23 and 24 which are secured to the frame 1. Secured to the forward end of the shaft 22 is a bevel gear wheel 25, which meshes with a bevel gear wheel 26 which is secured to a transverse shaft 27 which is rotatably mounted in bearings 28 secured to the frame 1. Also secured to the shaft 27 is a spur gear wheel 29 which meshes with a larger spur gear 30 which is rigidly secured to an axle 31, which is rotatably mounted in bearings 32 secured to the frame 1. Rotatably mounted on the axle 31 are two traction carrying wheels 33, which are adapted to be rotated independently of each other in either direction. Rotatable with the axle 31, and splined thereto so as to be capable of being slid respectively into locked engagement with the hubs of the carrying wheels 33, are two clutch members 34 provided at their outer ends with teeth 35 adapted to enter recesses 36' in the hubs of the wheels 33.

Two levers 36 are respectively pivoted to two brackets or bearings 37 secured to the frame 1. The forward ends of the levers 36 are bifurcated and respectively engage in the usual manner the grooved peripheries of the clutch members 34. Pivoted by horizontal pivots 38 to the rear ends of the levers 36 respectively are two handles 39 which are respectively adapted to enter the notched upper edges of two brackets 40 secured to the frame 1, whereby the clutch members 34 may be held respectively engaged or disengaged from the carrying wheels 33.

For tightening the belt 5, I provide a roller 41 which is rotatably mounted on the forward end of a lever 42, which is pivoted to the frame 1, and which has pivoted to its rear end a bell crank lever 43 connected by a rod 44 with a sliding bolt 45, which is adapted to engage the notched rear end of a vertical plate 46 secured to the frame 1.

The levers hereinbefore referred to are disposed at their rear ends so as to be operable by an operator standing upon a platform 47 which is secured to the rear end of the frame 1. The forward part of the frame 1 is pivotally supported in the usual manner upon the forward axle 48 on which are mounted the front carrying wheels 49. To turn the forward axle 48 it has secured to it at opposite sides of its axis the ends of a chain 50, which engages a sprocket wheel 51 secured to an upwardly and downwardly extending shaft 52 rotatable in a bearing 53 supported by the frame 1. Secured to the shaft 52 is a bevel gear wheel 54 which meshes with a bevel gear wheel 55 secured to the forward end of a shaft 56 mounted in the bearing 53 and having secured to its rear end a hand wheel 57.

In the operation of my invention, when it is desired to go straight ahead or backwardly, the clutch members 34 are both engaged with the wheels 33, as shown in Fig. 1. The clutch member 15 is then shifted to engagement with the gear 9 or 10 as the case requires for driving forwardly or backwardly. If the machine is moving forwardly and it is desired to turn to the left, the left lever 36 is swung so as to release the left clutch 34 from the adjacent wheel 33. The latter wheel will then cease rotating and the wheel 33 at the right will cause the machine to turn to the left. To turn to the right, the right clutch is disengaged and the left clutch member 34 is kept engaged with the adjacent wheel 33. To turn to the right or left while the machine is being driven backwardly, the clutch members 34 are operated as above described. If it is desired to stop the driving of the machine while permitting the engine 2 to run, the lever 42 is swung so as to release the roller 41 from the belt 5. By turning the hand wheel 57 the front axle 48 may be turned to correspond with the direction in which it is desired to turn the machine.

I do not limit my invention to the structure shown and described, as modifications, within the scope of the appended claims, may be made, without departing from the spirit of my invention.

What I claim is:—

1. In a tractor, a frame adapted to support a motor, a rotary axle supporting said frame, two traction carrying wheels supporting and independently rotatable in either direction on said axle, means for independently locking said carrying wheels to said axle, a shaft rotatably mounted on said frame, means adapted to be actuated by said motor for rotating said shaft, and transmission driving means connecting said shaft and said axle by which the axle may be driven in either direction.

2. In a tractor, a frame adapted to support a motor, a rotary axle supporting said frame, two traction carrying wheels supporting said axle and rotatable independently of each other in either direction thereon, means for independently locking said carrying wheels to said axle, a shaft rotatably mounted on said frame, means adapted to be actuated by said motor for rotating said shaft, two driving gears rotatable on said shaft, a driven gear meshing with said driving gears and adapted to be driven thereby alternately in opposite directions, means for transmitting rotation from the driven gear to said axle, and means for releasably locking either of said driving gears to said shaft.

3. In a tractor, a frame adapted to support a motor, a rotary axle supporting said frame, two traction carrying wheels supporting said axle and independently rotatable in either direction thereon, means for independently locking said carrying wheels to said axle, a shaft rotatably mounted on said frame, means adapted to be actuated by said motor for rotating said shaft, two driving gears rotatable on said shaft, a clutch member rotatable with said shaft and movable alternately into locked engagement with said driving gears, means for so moving said clutch member, a driven gear meshing with said driving gears and adapted to be driven alternately in opposite directions thereby, and means for transmitting rotation from said driven gear to said axle.

4. In a tractor, a frame adapted to support a motor, a rotary axle supporting said frame, two traction carrying wheels supporting said axle and rotatable thereon independently of each other in either direction, two clutch members rotatable with said axle and respectively slidable thereon into locked engagement with said two carrying wheels, means for independently moving said clutch members lengthwise on said axle so as to respectively engage said carrying wheels, a shaft rotatably mounted on said frame, means adapted to be actuated by said motor for rotating said shaft, two driving gears rotatable on said shaft, a third clutch member rotatable with said shaft and movable alternately into locked engagement with said driving gears, means for so moving said third clutch member, a driven gear meshing with said driving gears and adapted to be driven thereby alternately in opposite directions, and means for transmitting rotation from said driven gear to said axle.

5. In a tractor, a frame adapted to support a motor, a rotary axle supporting said frame, two traction carrying wheels supporting said axle and rotatable thereon independently of each other in either direction, means for independently locking the carrying wheels to the axle, a shaft rotatably mounted on said frame parallel with said axle, means adapted to be actuated by said motor for rotating said shaft, two driving gears rotatable on said shaft, means for releasably locking said driving gears to said shaft alternately and independently of each other, a driven gear meshing with said driving gears and adapted to be driven thereby alternately in opposite directions, a second shaft secured to said driven gear and disposed at right angles to the first named shaft, and driving means connecting the axle with said second shaft.

In testimony whereof I have signed my name to this specification in presence of two subscribing witnesses.

HILLIS A. HARRAH.

Witnesses:
J. RALPH HUDELSON,
J. M. STURN.

Copies of this patent may be obtained for five cents each, by addressing the "Commissioner of Patents, Washington, D. C."